UNITED STATES PATENT OFFICE.

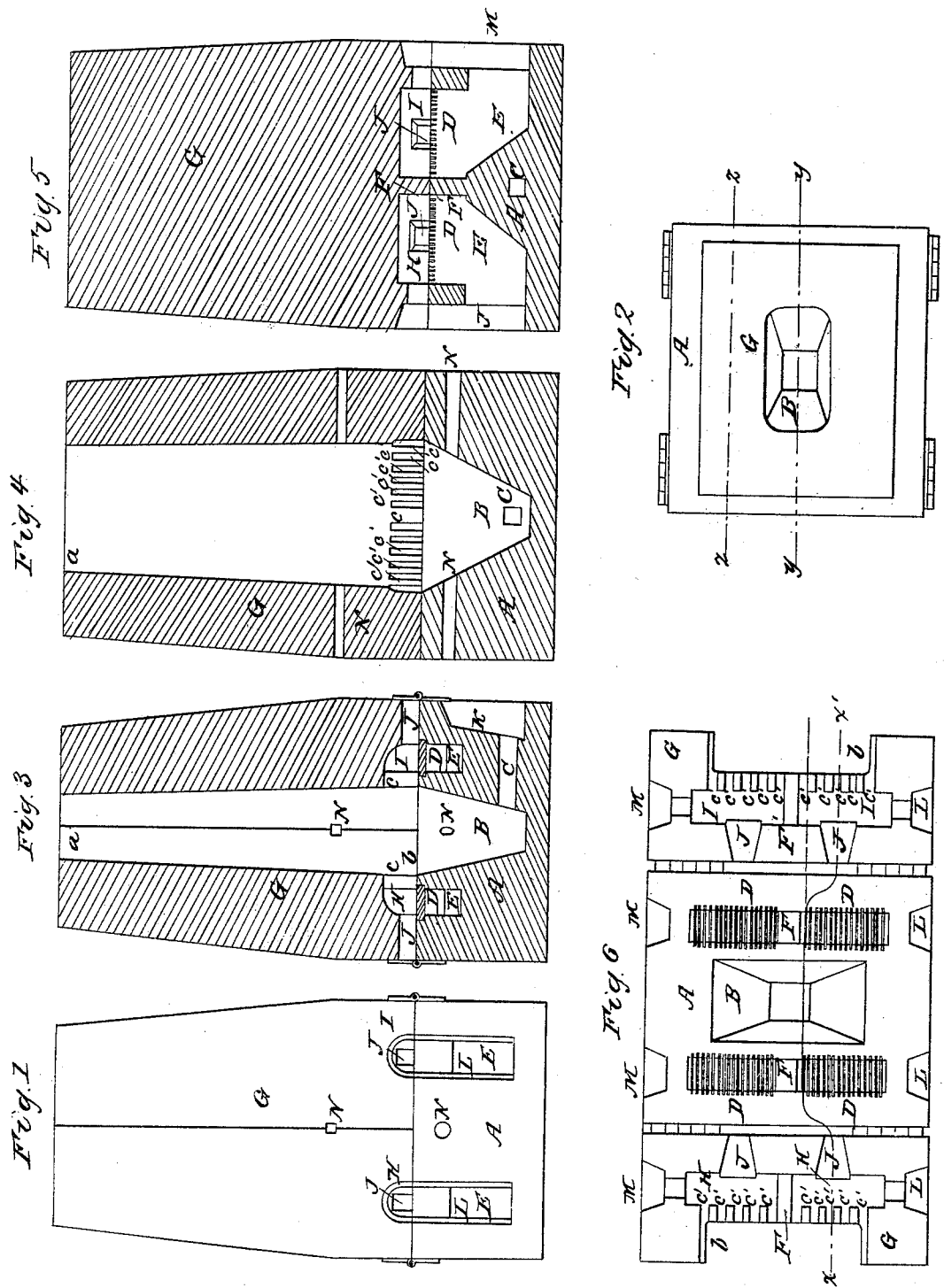

POWELL GRISCOM AND CHARLES S. DENN, OF BALTIMORE, MARYLAND.

LIMEKILN.

Specification of Letters Patent No. 18,635, dated November 17, 1857.

*To all whom it may concern:*

Be it known that we, POWELL GRISCOM and C. S. DENN, of Baltimore, in the State of Maryland, have invented a new and useful Improvements in Limekilns; and we do hereby declare that the following is a full, clear, and exact description of the same, reference being had to the accompanying drawings, forming part of this specification, in which—

Figure 1, is an external front view of a lime kiln constructed with our improvements. Fig. 2, is a plan of the same. Fig. 3, is a vertical transverse section in the line $x$, $x$, in Fig. 6. Fig. 4, is a vertical longitudinal section in the line $y$, $y$, in Fig. 2. Fig. 5, is a vertical longitudinal section in the line $z$, $z$, in Fig. 2. Fig. 6, is a plan view of the base of the kiln and inverted views of the sides of the same.

The nature of our invention consists in an arrangement, embracing, for united operation, as hereinafter set forth, the following several peculiar features to wit: 1st. The inverted oblong pyramidal lime basin in the base of the kiln, having discharge and clearing passages. 2nd. The fire grates and ash pits extending from front to back of basin, on each of the oblong sides of the same, but divided by central partitions. 3rd. The pyramidic burning stack with a chamber of oblong quadrilateral form at its base, and gradually running into an oval form as it terminates, and having fire chambers which extend from front to back, but are divided at center by partitions, and having also lateral flame and hot air passages leading directly into the chamber of the pyramidic stack, along the whole width of the quadrilateral portion of the burning chamber.

By the application of the furnaces in the manner above stated the fire is brought in closer and more immediate contact with the lime stone contained in the pyramidic stack than by any other mode of applying them, and by the transverse partition walls in the center of each furnace, the wind is prevented from blowing trough the furnaces, that is from blowing in at the doors and ash pits on one side and driving the blaze through doors and ash pits on the other, and by the quadrilateral and oval form of the stack and basin a greater surface of stone is brought in direct contact with the fire than with a stack of circular or square form, without increasing the diameter of said stack, owing to the flame from one fire having but a very narrow space or thin wall of lime stone to circulate through before meeting the flame from the other chamber, at the center of the stack, and thus every portion of the stone can be acted upon by the heat. This is important, for if the diameter of the stack be too great, the stone in the center will either not be burned into lime or the length of time that it will take to burn it will be so great that that portion first met by the flame will be burned too much and ruined, and finally by having the burning chamber taper gradually from base to top, and to change from a quadrilateral form at its base to an oval form as it terminates a concentration or an equal distribution of the draft or heat through the stone, without at all projecting the walls over the furnace, is effected, and thus the even settling of the contents is facilitated. This also is quite important.

To enable others skilled in the art to make and use our invention, we will proceed to describe its construction and operation.

A, represents the base of the kiln. It is made of quadrilateral form.

B, is the central basin which receives the manufactured lime and discharges it at one of the sides of the kiln through a lateral passage C. This basin in form resembles an inverted pyramid with two of its sides nearly double the length of the others. It is made thus so that the furnaces may be brought nearer the center of the kiln without decreasing the capacity of the stack, and so extended from back to front of the same as to heat the whole mass throughout.

D, D, are the grates and E, E, the ash pits of the furnaces. They extend, as just stated, from front to back of the kiln, but are divided at the center of their length by partitions F, F, so that the draft shall not blow in at the ash pit and doors on one side and thorugh doors and ash pits on the other.

G, represents the stack of the kiln. It has a chamber $a$, $b$, for containing the lime stone which is made of quadrilateral form at its base $b$, and gradually tapering and running into an oval form at its apex $a$. This chamber is also of oblong form so as to correspond with the form of the basin. This stack has the fire chambers H, I, formed in its base, said chambers extending from front to back of the kiln but being divided by partitions F', F', just as the ash pits and grates are divided at the center, and for the same purpose, viz: preventing the blowing of the draft entirely through the furnaces. The inner side c, of each of the fire chambers H, I, is made of open grating so that the flame and heat may attack the stone along the whole length of the burning chamber with a powerful and direct action, this being also aided materially by having the exposed sides of the partitions F, F, form inclined planes which concentrate the draft as it passes to the furnaces.

I, I, are draft flues, K, L, M, door openings, N, N, clearing or poking holes provided in the base and stack of the kiln.

We deem it proper before stating our claim to remark that the partitions F, F, which render the peculiarly constructed kiln herein described practicable and available to the extent set forth, were not shown or embraced in the individual applications filed by ourselves, bearing date respectively Decemebr 16th, 1856, and April 21st, 1857.

We do not wish to be understood as claiming any of the above parts separately, but What we do claim as our invention, and desire to secure by Letters Patent, is—

The peculiar combination and arrangement of the above parts substantially as described, and for the purposes set forth.

This specification of our improvement in lime kilns signed by us this 30th day of September, 1857.

POWELL GRISCOM.
CHARLES S. DENN.

Witnesses:
JOHN BOND,
SAM. E. GRISCOM.